United States Patent [19]
Bottum

[11] Patent Number: 6,014,569
[45] Date of Patent: *Jan. 11, 2000

[54] MOBILE INTERACTIVE RADIO

[75] Inventor: Joshua Bottum, New Providence, N.J.

[73] Assignee: AT&T Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/811,977

[22] Filed: Mar. 5, 1997

[51] Int. Cl.[7] ................................................. H04Q 7/20
[52] U.S. Cl. .......................... 455/466; 455/426; 455/550; 370/913
[58] Field of Search ........................... 455/466, 3.1–31.3, 455/38.1, 38.4, 422, 403, 426, 344, 550, 552, 575, 556; 370/395–396, 356, 913

[56] References Cited

U.S. PATENT DOCUMENTS

| | | | |
|---|---|---|---|
| 4,481,382 | 11/1984 | Villa-Real | 455/556 |
| 4,574,163 | 3/1986 | Zato . | |
| 5,390,362 | 2/1995 | Modjeska et al. | 455/38.1 |
| 5,481,544 | 1/1996 | Baldwin et al. . | |
| 5,557,541 | 9/1996 | Schulhof et al. | 364/400.01 |
| 5,594,779 | 1/1997 | Goodman | 455/418 X |
| 5,678,172 | 10/1997 | Dinkins | 455/5.1 |
| 5,694,120 | 12/1997 | Indekeu et al. | 340/825.44 |
| 5,697,060 | 12/1997 | Akahane | 455/38.1 |
| 5,719,906 | 2/1998 | Kayada | 375/354 |
| 5,732,074 | 3/1998 | Spaur et al. | 370/313 |
| 5,852,610 | 12/1998 | Olaniyan | 455/414 X |

FOREIGN PATENT DOCUMENTS

| | | |
|---|---|---|
| 97307142 | 8/1998 | European Pat. Off. . |
| 96 37081 | 11/1996 | WIPO . |

*Primary Examiner*—William G. Trost
*Attorney, Agent, or Firm*—Banner & Witcoff, Ltd.

[57] ABSTRACT

Methods and apparatus for providing asynchronous audio data to a mobile interactive radio are provided. A method for transmitting audio data includes receiving identification data from a subscriber and, in response to that identification data, transmitting asynchronous audio data to an authorized subscriber via a wireless communications system. The radio includes a receiver for receiving audio data, a converter for converting the data to an analog signal, and an amplifier for making audible that signal.

47 Claims, 4 Drawing Sheets

MOBILE INTERACTIVE RADIO

BACKGROUND OF THE INVENTION

This invention relates to wireless communications systems such as cellular telephone systems, and more particularly to cellular communications systems that provide asynchronous audio data to wireless subscribers.

Audio data may be transmitted to wireless subscribers in a variety of ways. One way involves the use of circuit switching. Wireless circuit switching is nearly identical to land line circuit switching because, in both cases, a communication path is established and dedicated for the duration of a call. An advantage of circuit switched communication is that the technology has been developed and refined for many years. However, a disadvantage of circuit switched combination is that the communication path is dedicated during the duration of the call. Dedication is inefficient when transmitting data because its transmission often involves short bursts of data occurring over very short periods of time. Therefore, the price paid for the call is for a much longer period of time than the time actually used to transmit data.

Another way of transmitting data over a wireless system involves the use of asynchronous packet switching. Packet switching involves breaking a data stream into a sequence of packets before they are transmitted. Each packet is transmitted by wireless system with a source address and a destination address, and then received, stored, and processed at a receiving terminal, such as a cellular telephone that corresponds to that destination address (i.e., subscriber ID). For example, voice can be transmitted over the internet and a radio channel using packet switching, in which the voice is converted to a series of packets. During the time interval that exists between the transmission of individual voice packets, other packets, voice or data, may be transmitted on the same channel. Therefore, in contrast to circuit switching, a radio channel or time slot of a radio channel (if a Time Division Multiple Access protocol is used) is not dedicated to a single subscriber over the duration of a call. Rather, two or more subscribers on a packet switched network can share network resources.

Wireless data is normally transmitted by using a Cellular Digital Packet Data ("CDPD") arrangement. CDPD takes advantage of the time intervals between successive packets of data on a single vacant channel and the pauses between sentences and syllables. Moreover, CDPD uses a channel-hopping technique that transmits short bursts of data between the end of one packet (i.e., voice or data) on one channel and the beginning of another packet on another channel. Wireless systems that use CDPD must install special equipment for transmitting and receiving CDPD, such as specialized base station and gateway equipment. An advantage of CDPD is that it accommodates a wide range of data services with a high degree of error protection comparable to many land line data networks.

CDPD has been used for reservation systems, electronic mail, vehicle tracking, and remote monitoring applications. These applications, however, demand a relatively small packet size—no more than about 4 or 5 kilobytes of data and are not ideally suited for the transmission of substantially continuous data, such as audio data.

In view of the foregoing, it is an object of the present invention to provide a method that uses asynchronous packet switching for applications that normally require substantially continuous transmission of data, such as audio data.

It is a more particular object of the invention to provide a system that uses CDPD for wireless transmission of audio data.

SUMMARY OF THE INVENTION

These and other objects of the invention are accomplished by the use of a mobile interactive radio (hereinafter, "MIR") for wireless communication with a wireless communications system using asynchronous packet switched audio data. A MIR includes a receiver for receiving packets of asynchronous audio data, a converter for converting the audio data to an analog signal, and an amplifier for making audible the analog signal.

Another object of the present invention is to provide a system for providing audio to a wireless subscriber. Such a system includes an audio data provider, a wireless system for transmitting the digital data, and a MIR for wireless communication with the wireless system. The system also preferably includes an audio data storage system and/or a real-time audio data source.

Yet another object of the present invention is to provide a method for transmitting audio to at least one MIR using a wireless system. The method includes at least two steps: (1) receiving identification data (hereinafter, "ID data"), including a radio ID and an audio ID corresponding to audio data and (2) transmitting the audio data in a digital format to a MIR via a wireless system if the subscriber is authorized.

In yet another aspect of the present invention, a method for receiving audio data transmitted by a wireless system using a MIR is provided. The method includes the steps of (1) receiving digital audio data by a receiver, converting the digital audio data to an analog audio signal by a converter, and making the analog audio signal audible to a subscriber by an amplifier.

Further features of the invention, its nature and various advantages, will be more apparent from the accompanying drawings and the following detailed description of the preferred embodiments.

DETAILED DESCRIPTION OF THE PREFERRED EMBODIMENTS

Figure 1:
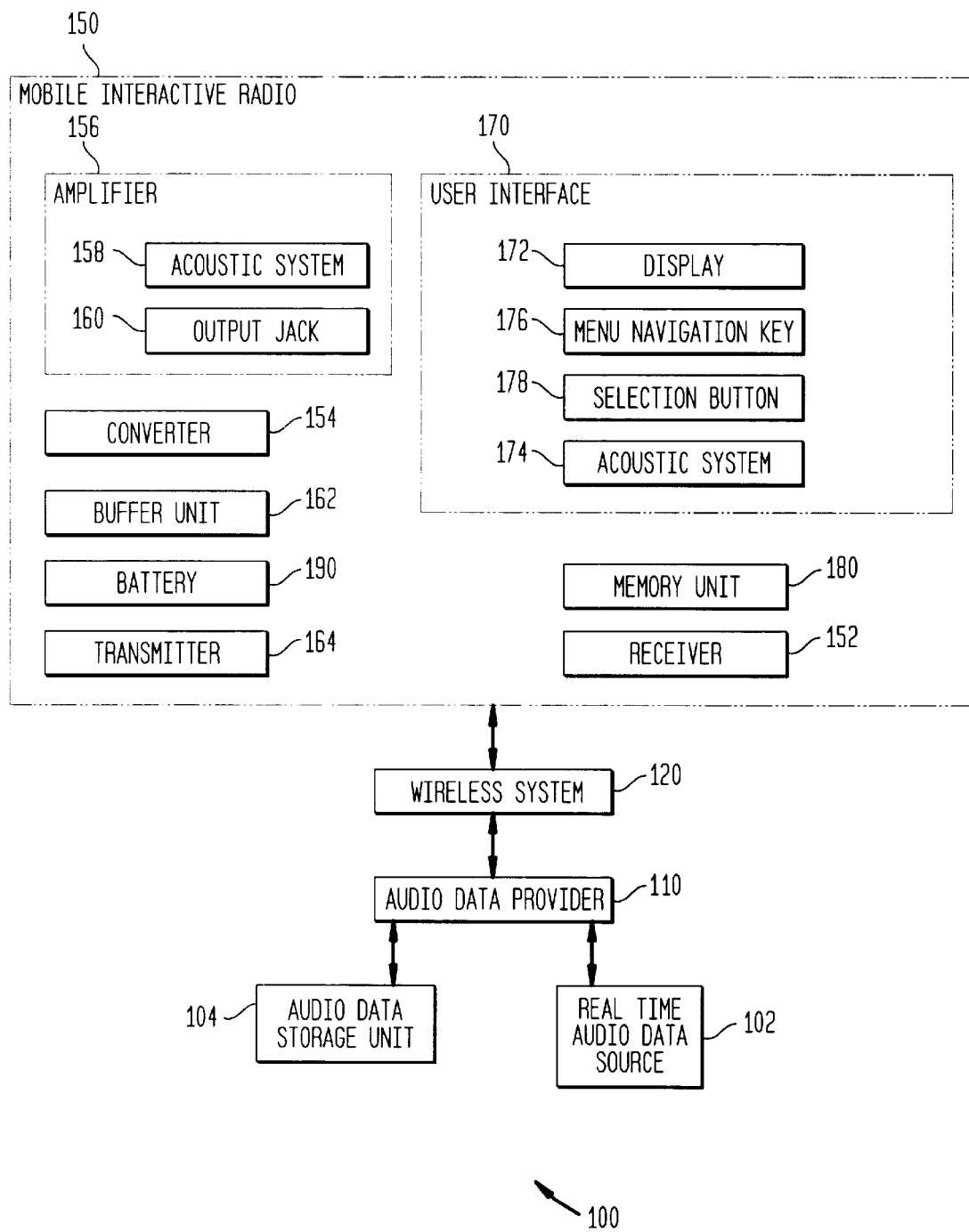
FIG. 1 is a simplified block diagram of an illustrative embodiment of a system for providing audio to a mobile subscriber according to this invention.

According to the present invention, a system and method for providing audio to a mobile subscriber using a MIR are provided. System 100 includes at least audio data provider 110, wireless system 120 for transmitting digitized packets of audio data, and MIR 150 for receiving the audio data from wireless system 120. System 100 may also include audio data storage system 104 and real-time audio data source 102.

Radio 150 includes at least receiver 152, converter 154, and amplifier 156. Receiver 152 is for receiving digital audio data transmitted by wireless system 120. Wireless system 120 preferably converts audio information to a stream of pulses and then mixes those pulses with a carrier frequency using any conventional modulation scheme (e.g., quadrature amplitude modulation) to convey that stream on the carrier frequency to receiver 152 of radio 150. Wireless system 120 may be any wireless data service, such as Air Data Express™ provided by AT&T Wireless Services, Inc., of Kirkland, Wash. Receiver 152 may be a telephone connection kit, such as those sold under the trademark PocketNet™ available from ATT Wireless Services, Inc., of Kirkland, Wash., in combination with any conventional data cable having a serial interface for connection to a serial port of mobile computing device. Alternatively, receiver 152 may be any CDPD Modem (such those sold under the trademark Personal Messenger™ as part No. 100C from Motorola, Inc., of Schaumburg, Ill.). Preferably, receiver 152 is capable of receiving more than one carrier frequency for hopping between channels, avoiding interference on a channel, and receiving multiple streams and types of data. The received data is then provided to a notebook computer (such as those sold under the trademark Satellite Pro™ available from Toshiba America Information Systems, Inc., of Irvine, Calif.) for further processing.

Radio 150 also includes converter 154. Converter 154 includes any hardware and software necessary to convert the packets of audio data to an analog signal. For example, converter 154 may include a notebook computer (such as the ones available from Toshiba America Information Systems, Inc., of Irvine, Calif.) and audio conversion software (such as the software sold under the trademark RealAudio Player™ as part No. S-4229 available from Progressive Networks, Inc., of Seattle, Wash.). Together, the notebook computer and the conversion software convert the audio data into an analog audio signal for further processing by amplifier 156.

Amplifier 156 preferably amplifies audio signals having a frequency range from about 20 Hz to about 20,000 Hz, without substantially distorting them. Preferably, amplifier 156 includes acoustic system 158 for providing audio through a surface mounted acoustic speaker. Amplifier 156 may also include output jack 160 for supplying the audio information to an external acoustic system through an audio cable. The audio information can be in any form compatible with the external acoustic system, including digital data and an analog signal. The external acoustic system may be a pair of headphones or an earplug. Alternatively, the external acoustic system may be an acoustic speaker mounted in a free-standing body. Of course, wireless means for supplying the audio signal to an external acoustic system are also possible, such as infra-red data links.

Radio 150 may include buffer unit 162 for temporarily storing audio data received by receiver 152. Once audio data is stored, it may be checked for transmission errors and those errors may be corrected. Correction of the errors may be performed before, during or after conversion to an analog signal by converter 154.

Radio 150 also preferably includes transmitter 164 for transmitting data to wireless system 120. Data transmitted to wireless system 120 may include identification data (hereinafter, "ID data") and request codes. ID data identify the subscriber using radio 150, or radio 150 itself, using a subscriber ID. ID data may also identify an audio selection that the subscriber wishes to be transmitted to radio 150 using an audio ID. A request code is a code for requesting information from audio data provider 110. For example, a menu request code is for requesting a menu of audio offerings. Audio offerings may be categories of audio data, such as news, sports, and music data, individual audio selections, such as specific news programs, sport events, and musical works, or any combination thereof.

Figure 2:
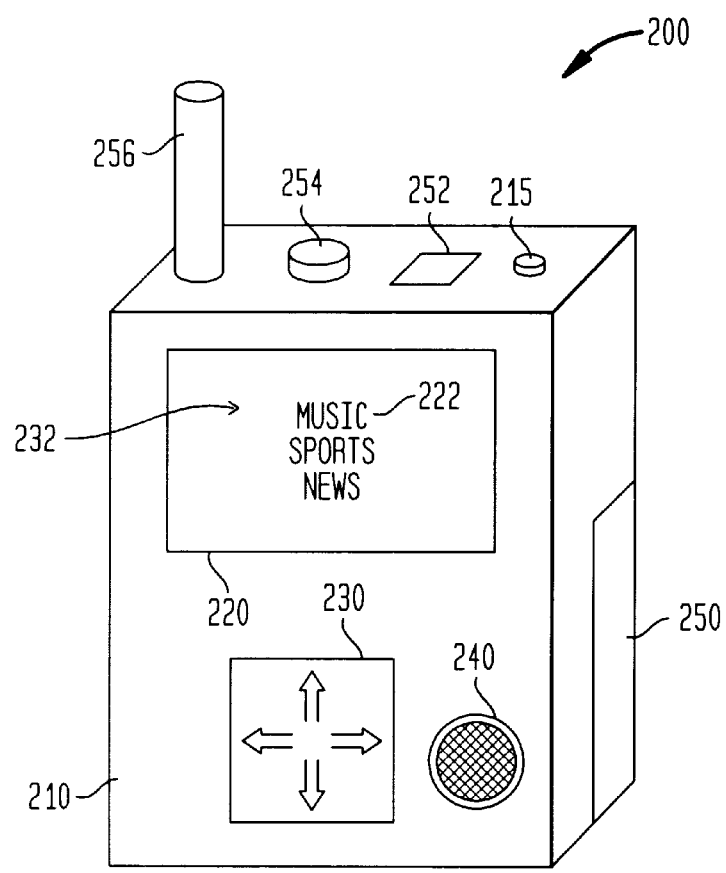
FIG. 2 is a perspective view of the mobile interactive radio constructed in accordance with this invention for use with the system of FIG. 1.

Preferably, radio 150 includes user interface 170. Interface 170 provides information to and receives instructions from a user. For example, interface 170 may provide a menu to a user visually on display screen 172 or acoustically on acoustic system 174. Of course, acoustic systems 158 and 174 may be one in the same. Also, interface 170 may act to receive instructions from the user. For example, user instructions may be received by radio 150 via a touch sensitive display screen, a voice recognition device or at least one menu navigation key. If menu navigation key 176 is used by a user to designate an audio offering (as shown in FIG. 2), radio 150 may also include selection button 178 for selecting the designated audio offering. Furthermore, radio 150 may include memory unit 180 for storing menu information previously transmitted by wireless system 120 or downloaded via a cable.

Finally, radio 150 preferably includes battery 190 so that a mobile subscriber may use radio 150 without requiring the use of a conventional power outlet. As shown in FIG. 2, other features may be included, such as power switch 252, volume control knob 254, and antenna 256.

The communication link between wireless system 120 and audio data provider 110 may be land-based or wireless. For example, wireless system 120 and provider 110 may be linked by a conventional public switched telephone network. Moreover, if audio data provider 110 is accessible through an Internet home page, the protocol used to send and receive data between wireless system 120 and audio data provider 110 may be synchronous or asynchronous. Of course, more than one link or protocol may be necessary for communication between wireless system 120 and audio data provider 110 if intermediate nodes are required to complete the communications path.

Audio data may be stored by audio data provider 110 for eventual transmission to radio 150. However, audio data provider 110 may not be the original source of audio data transmitted to radio 150. For example, real-time audio data may be provided to provider 110 by real-time audio data source 102. Examples of real-time audio data are "live" sport events and musical concerts. For these examples, it may be desirable to provide the audio data to radio 150 by routing the real-time data to provider 110, without storing it at all. However, if the audio data is desirably stored before transmission, the audio data may be stored in audio data storage unit 104 remote from provider 110 so that the audio data may be retrieved by audio data provider 110 on demand.

One illustrative embodiment of radio 150 is shown in FIG. 2 as radio 200. Radio 200 is preferably the size of a conventional hand held audio player, such as those sold under the trademark Walkman™ available from Sony Corporation, of Tokyo, Japan. As discussed above, a mobile interactive radio includes a receiver, a converter, and an amplifier. These components, and others, are preferably mounted in body 210, which may be constructed from any relatively hard and durable material, such as plastic, graphite, and metal. Body 210 may further be used for mounting an acoustic speaker system (not shown) or for mounting outlet jack 215 for connection to a remote acoustic system (not shown). Of course, jack 215 could provide digital or analog data in raw or amplified form to the remote acoustic system.

Radio 200 may include display screen 220 for providing menu 222 of audio offerings to a user. Screen 220 may be any conventional display screen, such as the ones based on liquid crystal or light-emitting diode technologies. Also, screen 220 may be touch sensitive, so that a user may provide an instruction to radio 200 directly through screen 220. Screen 220 may further be used in conjunction with at least one menu navigation key 230. Key 230 is for controlling the position of cursor 232 on display screen 220. Once curser 232 is positioned as desired, the user may push navigation key 230 to select the desired instruction corresponding to that position. Alternatively, the user may push separate selection button 240 for selecting the desired instruction corresponding to that position. Of course, radio 200 may also include removable battery 250 for wireless operation. Preferably, battery 250 is rechargeable.

Figure 3:
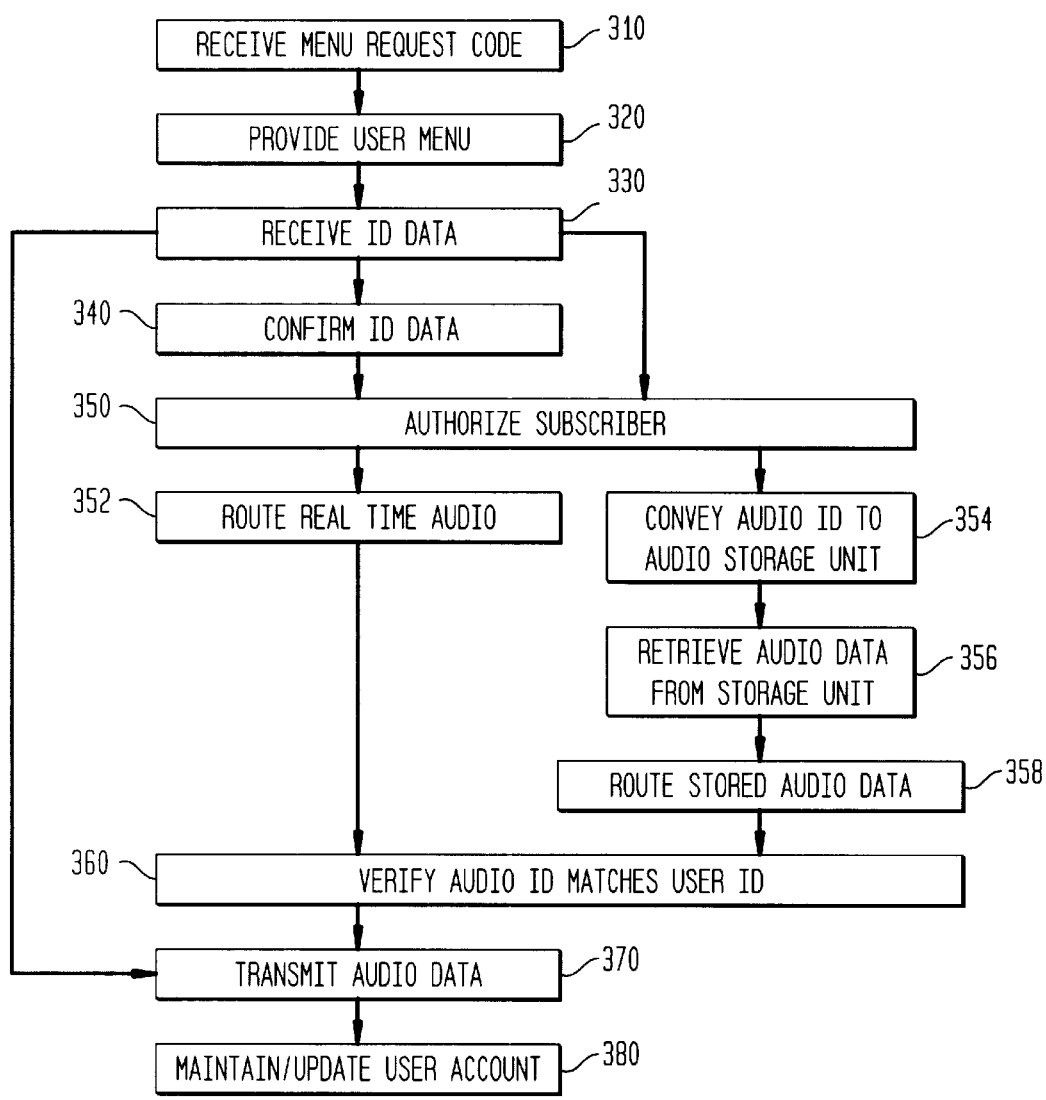
FIG. 3 is a flow chart of steps for carrying out an illustrative embodiment of the method for transmitting audio according to this invention.

FIG. 3 shows an illustrative sequence of steps in accordance with this invention for transmitting audio to at least one mobile interactive radio via wireless system 120 of FIG. 1. To some extent these steps have already been mentioned, so the discussion of them here may be somewhat abbreviated.

The method includes at least two steps 330 and 370. In step 330, an audio data provider receives ID data. The ID data includes at least a subscriber ID and an audio ID corresponding to audio data, although that information need not be received by audio data provider 110 simultaneously. For example, subscriber ID may be received by audio data provider 110 in order to notify audio data provider 110 that the subscriber corresponding to that subscriber ID is about to request audio data from provider 110. Once provider 110 has been notified, audio data may be requested by providing to provider 110 an audio ID that corresponds to that data. In step 370, the digital audio data is transmitted to radio 150 by wireless system 120 in response to step 330 if the subscriber corresponding to the subscriber ID has been authorized.

Between steps 330 and 370, in step 350, the subscriber is authorized if a predetermined condition is satisfied. For example, in step 350, a subscriber ID may be cross-referenced with a database of approved subscribers. In that case, if the subscriber ID is an approved subscriber, the predetermined condition is satisfied.

Before step 330, the subscriber may be provided, in step 320, a menu of at least one audio offering having an audio ID. As previously discussed, an audio offering may be a category of audio data or an individual audio selection. Step 320 may be in response to step 310, in which audio data provider 110 receives a menu request code from a subscriber. Of course, it is not necessary that the subscriber actively request a menu in order to receive one because menu data may be sent automatically to a subscriber when the radio is turned on.

In step 330, the ID data may be provided from a terminal that is in wireless or land-based communication with audio data provider 110. For example, if MIR 150 has a transmitter, MIR may transmit the ID data itself. In fact, any terminal, including telephones and micro-computers with a modem, may provide ID data to audio data provider. Audio data provider 110 may be any device or service capable of communicating with the subscriber and providing audio data to that subscriber on demand. One such service is provided under the trademark AudioNet™ available on the Internet at http://www.audionet.com from Cameron Audio Networks, Inc., of Dallas, Tex. Users can gain access to audio data providers on the Internet by any Internet access provider (such as through the WorldNet™ service available from American Telephone and Telegraph Company of New York, N.Y. Once at the home page of an Internet audio data provider, the subscriber may select one or more audio offerings for transmission to MIR 150. Alternatively, a subscriber could connect to a non-Internet audio data provider 110 by calling that provider directly and selecting audio data for transmission to MIR 150.

In step 340, audio data provider confirms that the audio ID received by that provider is correct. For example, if a subscriber requests music, audio data provider may ask the subscriber to confirm the musical selection before the data is transmitted. If a list of audio selections is requested by a subscriber, confirmation of that list may be accomplished by furnishing the list to the subscriber on a display screen and requesting that the subscriber confirm that list.

Audio data provider 110 could transmit audio data to more than one radio 150 simultaneously. For example, as already discussed above, audio data is transmitted to a radio corresponding to an authorized subscriber. Therefore, if more than one radio corresponds to the same subscriber ID, each of those radios could receive the same audio data simultaneously. Furthermore, even when every radio is assigned a unique subscriber ID, those subscriber IDs could be grouped with common characteristics so that such a group could receive the same audio data simultaneously.

In step 352, if the audio selected by the subscriber corresponds to real-time audio data, that audio data is routed from real-time audio data source 102 (which may be remote from audio data provider 110) to wireless system 120 before step 370.

However, if the audio selected by the subscriber corresponds to audio data previously stored in an audio data storage unit, method 300 preferably includes steps 354, 356, and 358. In step 354, the audio ID is conveyed to the audio data storage unit in response to step 330. In step 356, audio data corresponding to the audio ID is retrieved from the audio data storage unit. And, in step 358, the corresponding audio data is routed to wireless system 120 for eventual transmission to radio 150. Like real-time audio data source 102, audio data storage unit 104 may be remotely located from provider 110.

Whether for real-time or previously stored audio data, the audio ID that corresponds to that data is preferably verified before step 370 to make certain that the audio ID is properly matched with the subscriber ID.

In step 380, a subscriber account is updated. As used herein, a subscriber account is any database that can record subscriber related information, such as a billing address and a record of audio data transmitted for said subscriber. In this way, the subscriber may be billed appropriately according to the services provided to that subscriber.

Figure 4:
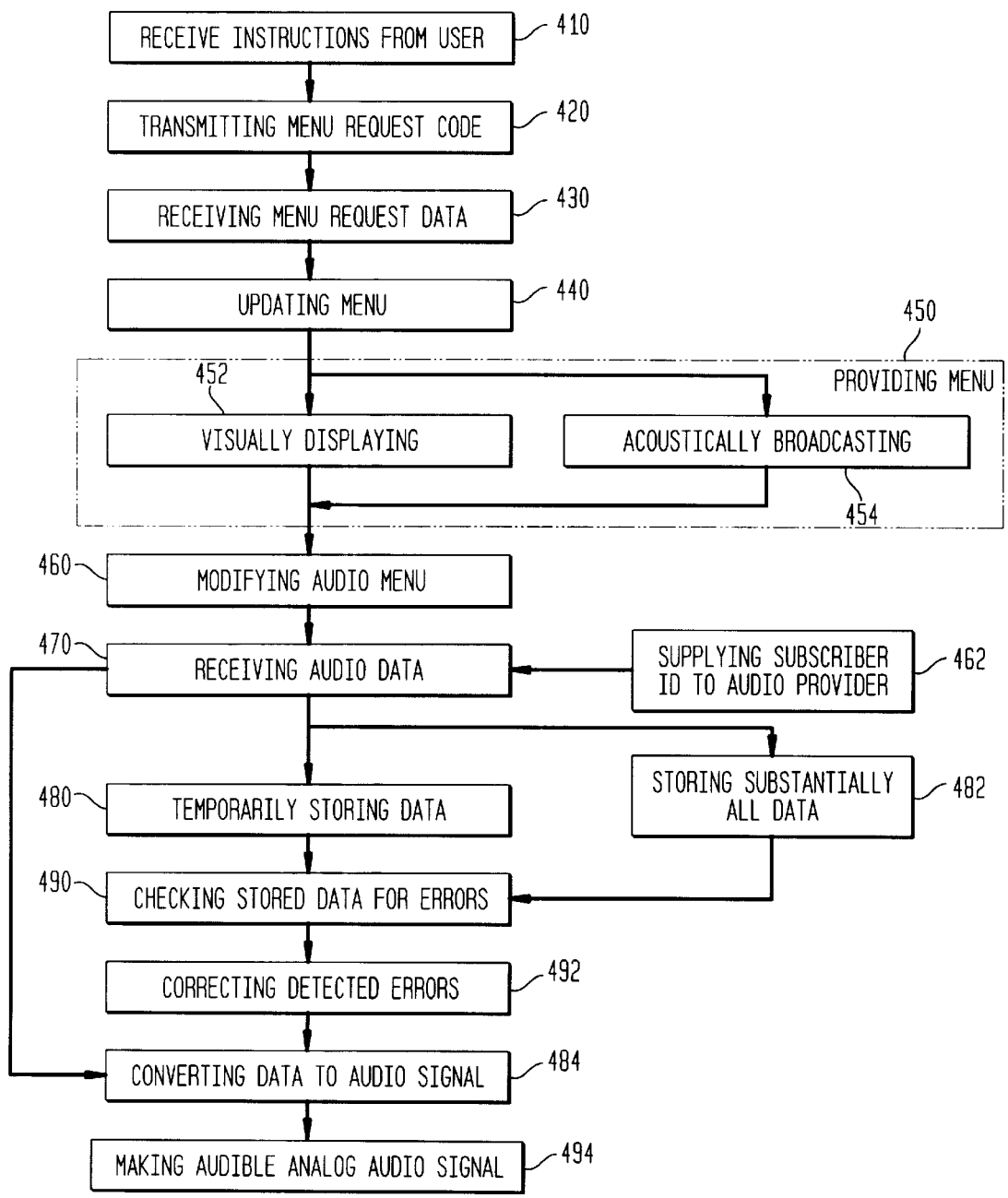
FIG. 4 is a flow chart of steps for carrying out an illustrative embodiment of the method for receiving audio according to this invention.

FIG. 4 shows an illustrative sequence of steps in accordance with this invention for receiving audio data transmitted by a wireless system using the system of FIG. 1 and optionally in conjunction with the steps of FIG. 3.

The method for receiving audio data shown in FIG. 4 at least includes, in step 470, receiving asynchronous audio data by a receiver; in step 484, converting that data to an analog audio signal by a converter; and, in step 494, making audible the audio signal with an amplifier.

Following step 470, in step 480, at least a portion of the audio data is temporarily stored in a buffer unit. Preferably, the audio data is stored immediately following step 470, but could be performed either during or after step 484 as well. For example, in step 490, transmission errors are detected and, in step 492, detected errors are corrected. Preferably, the stream of audio data being received and stored in buffer unit 162 corresponds to a period of time that is sufficient for radio 150 to perform steps 492 and 494.

In step 410, instructions are received from a subscriber to provide a menu that includes at least one menu offering. As discussed above, an audio offering may be a category of audio data, such as news, sports or music data, or an individual audio selection, such as a specific news program, sport event or musical work.

In response to step 410, in step 450, a menu is provided to the subscriber. The menu may be generated from information already loaded into radio 150. For example, a portion of the menu data may be preloaded into radio 150 by any conventional means, such as through a data cable connected to a server. Then, step 450 could generate a menu using that preloaded data. The menu may also be generated directly, either in whole or in part, from data downloaded to radio 150 via wireless system 120. For example, in step 420, a subscriber ID and a menu request code is transmitted to wireless system 120. Then, in step 430, menu data containing information necessary to construct a menu is received, preferably via receiver 152. In step 440, a menu stored in memory unit 180 of radio 150 may be updated with the menu data in response to step 430.

Once the menu data has been received, the menu may be provided to the user in step 450 in a number of ways. In step 452, for example, the menu is displayed on a display screen for visual perception by a subscriber. Alternatively, or in conjunction with step 452, the menu, or related information, such as instructions, may be acoustically broadcast through an acoustic system for audible perception by the subscriber.

In step 460, the menu is modified in response to instructions provided by the subscriber. Modification of the menu may be the deletion of one or more menu offerings or the rearrangement of menu offerings on a display screen. Step 460 is optional and may be unnecessary when the number of menu offerings is relatively small.

When the audio data has a finite size (i.e., corresponding to a predetermined period of time), it may be downloaded, in step 482, to buffer unit 162 before any portion of that data is made audible in step 494. An advantage of downloading substantially all of the audio data before step 494 is performed is that the receiver can be deactivated during radio use. This allows radio operation in geographical regions that are not serviced by wireless system 120. For example, cellular systems limit reception to a number of geographical cells. Therefore, downloading the audio data into radio 150 before step 494 is performed allows the user to listen to the audio signal outside of those cells. Preferably, step 482 stores substantially all of the audio data in the memory unit before step 484. Of course, that data may be compressed before storage by any conventional data compression technique and decompressed before step 494.

It will be understood that the foregoing is only illustrative of the principles of the invention and that various modifications can be made by those skilled in the art without departing from the scope and spirit of the invention. For example, the invention can be used with any asynchronous data protocol for wireless transmission of data, not just CDPD. Of course, circuit-switched data protocols may also be desirable for use with this invention if their data transmission rates become comparable to or faster than present asynchronous rates. It should also be understood that the invention may be used for wireless transmission of data generally, including video data.

The invention claimed is:

1. A mobile interactive radio for wireless communication with a wireless system using asynchronous audio program data, wherein said audio program data is substantially continuous, said radio comprising:

a receiver for receiving a first portion of said audio program data as one or more digitized packets, and subsequently receiving a second portion of said audio program data as one or more digitized packets;

a converter for converting said first received portion of said audio program data to an analog audio signal; and an amplifier for making audible said analog audio signal, wherein said receiver receives said second portion of said audio program data after said converter has converted said first received portion of said audio program data.

2. The radio of claim 1 wherein said amplifier comprises an amplification circuit for amplifying audio signals having a frequency between about 20 Hz and about 20,000 Hz.

3. The radio of claim 1 further comprising a housing and wherein said amplifier further comprises a first acoustic system mounted to said housing.

4. The radio of claim 1 wherein said amplifier comprises an outlet jack for carrying said analog audio signal to a second acoustic system that is substantially outside said housing.

5. The radio of claim 1 further comprising a buffer unit for temporarily storing data transmitted by said wireless system.

6. The radio of claim 1 further comprising a transmitter for sending ID data to said wireless system.

7. The radio of claim 1 further comprising a display screen for making visible a menu of at least one audio offering.

8. The radio of claim 7 further comprising at least one menu navigation key for designating one of said at least one audio offering.

9. The radio of claim 8 further comprising at least one selection button for selecting said designated audio offering.

10. A system for providing audio to a wireless subscriber, said system comprising:

a wireless system for transmitting asynchronous audio program data, wherein said audio program data is substantially continuous; and a mobile interactive radio for wireless communication with said wireless system that uses said audio program data, said radio comprising:

a receiver for receiving a first portion of said audio program data as one or more digitized packets, and subsequently receiving a second portion of said audio program data as one or more digitized packets;

a converter for converting said first received portion of said audio program data to an analog audio signal; and an amplifier for making audible said analog audio signal, wherein said receiver receives said second portion of said audio program data after said converter has converted said first received portion of said audio program data.

11. The radio of claim 10 wherein said receiver comprises a CDPD modem.

12. The radio of claim 10 wherein said analog audio signal has an amplitude, and said amplifier comprises an amplification circuit for increasing said amplitude.

13. The radio of claim 10 further comprising a housing and wherein said amplifier further comprises a first acoustic system mounted substantially inside said housing.

14. The radio of claim 10 wherein said amplifier comprises an outlet for providing said analog signal to a second acoustic system substantially outside said housing.

15. The radio of claim 10 further comprising a buffer unit for temporarily storing data transmitted by said wireless system.

16. The radio of claim 10 further comprising a transmitter for sending ID data to said wireless system.

17. The radio of claim 10 further comprising a display screen for making visible a menu of at least one audio offering.

18. The radio of claim 17 further comprising at least one menu navigation button for designating one of said of at least one audio offering.

19. The radio of claim 18 further comprising at least one selection button for selecting said designated audio offering.

20. A method for transmitting asynchronous audio program data to at least one mobile interactive radio via a wireless system, wherein said audio program data is substantially continuous, said radio having a corresponding subscriber and a subscriber ID, said method comprising the steps of:

receiving ID data comprising said subscriber ID and an audio ID corresponding to said audio program data;

transmitting a first portion of said audio program data in a packet format to said radio via said wireless system, wherein said radio converts said first portion of said audio program data to audible form;

transmitting a second portion of said audio program data in said packet format to said radio via said wireless system after said radio has converted said first portion of said audio program data to audible form.

21. The method of claim 20 wherein said ID data is received from said radio.

22. The method of claim 20 further comprising the step of:

authorizing said subscriber to receive said audio program data before said step of transmitting a first portion of said audio program data.

23. The method of claim 22 wherein said step of authorizing comprises the step of:

cross-referencing said subscriber ID with a database of approved subscribers.

24. The method of claim 20 further comprising the step of:

providing said subscriber via said radio a menu of at least one audio offering corresponding to said audio ID before said step of receiving ID data.

25. The method of claim 24 further comprising the step of:

receiving a menu request code sent by said subscriber before said step of providing said menu.

26. The method of claim 24 wherein said at least one audio offering corresponds to audio program data selected from the group consisting of news, sports and music data.

27. The method of claim 20 further comprising the step of:

confirming that said received audio ID is proper after said step of receiving.

28. The method of claim 20 wherein said audio ID corresponds to real-time audio program data, said method further comprising the step of:

routing said real-time audio program data to said wireless system before said step of transmitting.

29. The method of claim 20 wherein said audio ID corresponds to audio program data stored in an audio data storage unit, said method further comprising the steps of:

conveying said audio ID to said audio data storage unit in response to said step of receiving;

retrieving said corresponding stored audio program data from said audio data storage unit; and routing said corresponding audio program data to said wireless transmitter for transmission to said radio.

30. The method of claim 20 further comprising the step of:

verifying that said audio ID is properly matched with said subscriber ID before transmitting said audio program data.

31. The method of claim 20 further comprising the step of:

updating a subscriber account that includes a record of audio program data transmitted to said subscriber.

32. The method of claim 20 wherein said audio data transmitted to said radio via said wireless system packet is in a Cellular Digital Packet Data format.

33. The method of claim 20, further comprising the step of transmitting said audio program data to one or more additional mobile interactive radios.

34. The method of claim 33, wherein each of said one or more additional mobile interactive radios is assigned said subscriber ID.

35. A method for receiving asynchronous audio program data transmitted by a wireless system using a mobile interactive radio, wherein said audio program data is substantially continuous, said method comprising the steps of:

receiving a first portion of said audio program data in a packet format;

converting said first portion of said audio program data to an analog audio signal;

making audible said analog audio signal; and receiving a second portion of said audio program data in said packet format after making audible said analog audio signal.

36. The method of claim 35 wherein said radio further comprises a buffer unit, said method further comprising the step of:

temporarily storing at least a portion of said audio program data in said buffer unit before said step of making audible.

37. The method of claim 36 further comprising the steps of:

detecting one or more transmission errors in data stored by said step of temporarily storing; and correcting said one or more transmission errors detected in said step of detecting.

38. The method of claim 35 further comprising the steps of:

receiving instructions from said subscriber to provide a menu including at least one menu offering; and providing said menu to said subscriber.

39. The method of claim 38 further comprising the steps of:

after said step of receiving instructions, transmitting a subscriber ID and a menu request code to said wireless system; and before said step of providing said menu, receiving menu data from said wireless system.

40. The method of claim 39 wherein said radio further comprises a memory unit for storing said menu, said method further comprising the step of:

updating said menu stored in said memory in response to said step of receiving menu data.

41. The method of claim 38 wherein said radio further comprises a display screen, wherein said step of providing said menu comprises the step of:

displaying said menu on said display screen for visual perception by said subscriber.

42. The method of claim 38 wherein said radio further comprises an acoustic speaker, wherein said step of providing said menu comprises the step of:

acoustically broadcasting said menu on said acoustic speaker for audible perception by said subscriber.

43. The method of claim 38 further comprising the steps of:

modifying said menu in response to instructions by said subscriber.

44. The method of claim 35 wherein said radio further comprises a buffer unit and said audio program data has a finite size, said method further comprising the step of:

storing substantially all of said audio program data in said buffer unit before said step of making said analog audio signal audible.

45. The method of claim 44 wherein said step of storing comprises the step of:

storing substantially all of said audio program data in said buffer unit before said step of converting.

46. The method of claim 35 further comprising the step of:

before said step of receiving, supplying a subscriber ID to an audio program data provider.

47. The method of claim 46 wherein said step of supplying comprises:

supplying said subscriber ID to said audio program data provider using a terminal selected from the group consisting of a wired terminal and a wireless terminal.

\* \* \* \* \*

UNITED STATES PATENT AND TRADEMARK OFFICE
CERTIFICATE OF CORRECTION

PATENT NO.: 6,014,569

DATED: January 11, 2000

INVENTOR: Joshua BOTTUM

It is certified that errors appear in the above-identified patent and that said Letters Patent is hereby corrected as shown below:

In Claim 14, column 8, line 60, after "analog", --audio-- has been inserted.

In Claim 18, column 9, line 2, "of" (second occurrence) has been deleted.

In Claim 29, column 9, line 57, "said" (second occurrence) has been replaced by --a--.

In Claim 32, column 10, line 2, "packet" has been deleted.

Signed and Sealed this

Twentieth Day of February, 2001

*Attest:*

NICHOLAS P. GODICI

*Attesting Officer*   *Acting Director of the United States Patent and Trademark Office*